United States Patent
Nama et al.

(10) Patent No.: US 10,133,856 B2
(45) Date of Patent: Nov. 20, 2018

(54) METHOD AND SYSTEM FOR MANAGING SOFTWARE LICENSE FOR VEHICLE

(71) Applicant: HONEYWELL INTERNATIONAL INC., Morris Plains, NJ (US)

(72) Inventors: Naveen VenkateshPrasad Nama, Bangalore (IN); Dilip Kumar Behara, Bangalore (IN); John McGregor, Phoenix, AZ (US); Christian Dale Brinkley, Plymouth, MN (US); Scott Redmond, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 199 days.

(21) Appl. No.: 15/345,040

(22) Filed: Nov. 7, 2016

(65) Prior Publication Data

US 2018/0129790 A1 May 10, 2018

(51) Int. Cl.
| | |
|---|---|
| *G06F 21/12* | (2013.01) |
| *B64C 25/26* | (2006.01) |
| *B64C 25/42* | (2006.01) |
| *G06F 21/10* | (2013.01) |
| *H04L 29/06* | (2006.01) |
| *G08G 5/00* | (2006.01) |

(52) U.S. Cl.
CPC ............ *G06F 21/105* (2013.01); *B64C 25/26* (2013.01); *B64C 25/42* (2013.01); *G06F 21/121* (2013.01); *H04L 63/0876* (2013.01); *G08G 5/0021* (2013.01)

(58) Field of Classification Search
CPC ...... B64C 25/26; B64C 25/42; G08G 5/0021; G06F 21/105; G06F 21/121; H04L 63/0876

USPC .......................................................... 705/59
See application file for complete search history.

(56) References Cited

U.S. PATENT DOCUMENTS

| | | | |
|---|---|---|---|
| 5,014,234 | A | 5/1991 | Edwards, Jr. |
| 9,015,696 | B2 | 4/2015 | Demeyer |
| 10,027,759 | B2 * | 7/2018 | Shannir ................ H04L 67/125 |
| 2003/0110011 | A1 | 6/2003 | Kyotoku |

(Continued)

FOREIGN PATENT DOCUMENTS

WO 2005104426 A2 11/2005

OTHER PUBLICATIONS

Extended EP Search Report for Application No. 17199283.7-1870 dated Dec. 21, 2017.

(Continued)

*Primary Examiner* — Khoi H Tran
*Assistant Examiner* — Robert T Nguyen
(74) *Attorney, Agent, or Firm* — Lorenz & Kopf, LLP (57) ABSTRACT

A method of managing a license for a software module of a vehicle having a plurality of operating states includes receiving, by a processor, license term data of the license. The license term data includes an expiration time limit of the license. The method also includes observing, by a sensor, a condition of the vehicle. Additionally, the method includes determining, by the processor, an operating state of the vehicle based on the condition observed by the sensor. Furthermore, the method includes determining, by the processor, whether to deny access to the software module according to the expiration time limit based on the determined operating state.

20 Claims, 5 Drawing Sheets

(56) References Cited

U.S. PATENT DOCUMENTS

| | | |
|---|---|---|
| 2007/0115140 A1 | 5/2007 | Bateman et al. |
| 2009/0157224 A1* | 6/2009 | Blanc .................... B25J 9/1674 700/250 |
| 2011/0321172 A1 | 12/2011 | Maeda et al. |
| 2012/0303392 A1* | 11/2012 | Depura ............. H04W 52/0258 705/4 |
| 2014/0122678 A1 | 5/2014 | Miner et al. |
| 2016/0269542 A1 | 9/2016 | Arcese et al. |

OTHER PUBLICATIONS

Anonymous, "Software Protection Dongle," Wikipedia, Oct. 26, 2016, XP055433601, retrieved from the Internet: URL: https://en.wikipedia.org/w/index.php?title=Software_protection_dongle&oldid=746254745 [retrieved on Dec. 8, 2017], pp. 1, 3.

* cited by examiner

METHOD AND SYSTEM FOR MANAGING SOFTWARE LICENSE FOR VEHICLE

TECHNICAL FIELD

The present disclosure generally relates to managing software licenses and, more particularly, relates to a method and system for managing expiration of a trial software license for a vehicle.

BACKGROUND

Vehicles often utilize software for certain operations. In some cases, use of the software may be subject to a license agreement between a licensee (e.g., the user of the vehicle's computer system, the owner of the vehicle, etc.) and a licensor (e.g., the software provider or another copyright owner).

It may be advantageous in some situations to allow the software to be used on a trial basis for a limited time. As such, the user may try the software to evaluate whether the software is worth obtaining a more extensive license. For example, in some cases, a software provider and a user may enter into a trial license agreement (i.e., an evaluation license agreement), allowing the user to try and evaluate the software for a limited time.

However, managing a trial license may present certain challenges and disadvantages. For example, the license may have a fixed term causing it to expire at an inopportune time. As a result, the user may not be able to fully use and evaluate the software as intended, and the user may be less likely to obtain the more extensive license to the software.

Accordingly, it is desirable to provide an improved system and method of managing software licenses. For example, it is desirable to provide an improved system and method of managing expiration of a trial software license (i.e., software evaluation license). Other desirable features and characteristics of the present disclosure will become apparent from the subsequent detailed description and the appended claims, taken in conjunction with the accompanying drawings and the foregoing technical field and background.

BRIEF SUMMARY

In one embodiment, a method of managing a license for a software module of a vehicle having a plurality of operating states is disclosed. The method includes receiving, by a processor, license term data of the license, wherein the license term data includes an expiration time limit of the license. The method also includes observing, by a sensor, a condition of the vehicle. Additionally, the method includes determining, by the processor, an operating state of the vehicle based on the condition observed by the sensor. Furthermore, the method includes determining, by the processor, whether to deny access to the software module according to the expiration time limit based on the determined operating state.

In another embodiment, a system for managing a license for a software module of a vehicle is disclosed. The system includes a processor configured to receive license term data of the license, wherein the license term data includes an expiration time limit of the license. The system also includes a sensor configured to observe a condition of the vehicle. The processor is configured to determine an operating state of the vehicle based on the observation by the sensor. Additionally, the processor is configured to determine whether to deny access to the software module according to the expiration time limit based on the determined operating state of the vehicle.

In a further embodiment, a method of managing a license to an avionics software module for an aircraft includes receiving, by a processor, license term data of the license. The license term data includes a first expiration time limit of the license. The method also includes receiving, by the processor, clock data from a universally coordinated clock. The clock data corresponds to a current time. The method additionally includes comparing the current time to the first expiration time limit to determine an expiration status of the license. Moreover, the method includes observing, by a sensor, a condition of the vehicle. Furthermore, the method includes determining, by the processor, that the aircraft is in one of a first operating state and a second operating state based on the condition observed by the sensor. Also, the method includes denying access to the software module according to the first expiration time limit based on the determination that the vehicle is in the first operating state. The method additionally includes denying access to the software module according to an extended expiration time limit based on the determination that the vehicle is in the second operating state. The extended expiration time limit is equal to the first expiration time limit increased by a predetermined time interval.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

In addition, those skilled in the art will appreciate that embodiments of the present disclosure may be practiced in conjunction with any method and/or system for managing a software license. It will also be appreciated that the methods and systems for managing a software license described herein are merely exemplary and configured according to the present disclosure. Further, it should be noted that many alternative or additional functional relationships or physical connections may be present in an embodiment of the present disclosure. In addition, while the figures shown herein depict examples with certain arrangements of elements, additional intervening elements, devices, features, or components may be present in an actual embodiment.

Figure 1:
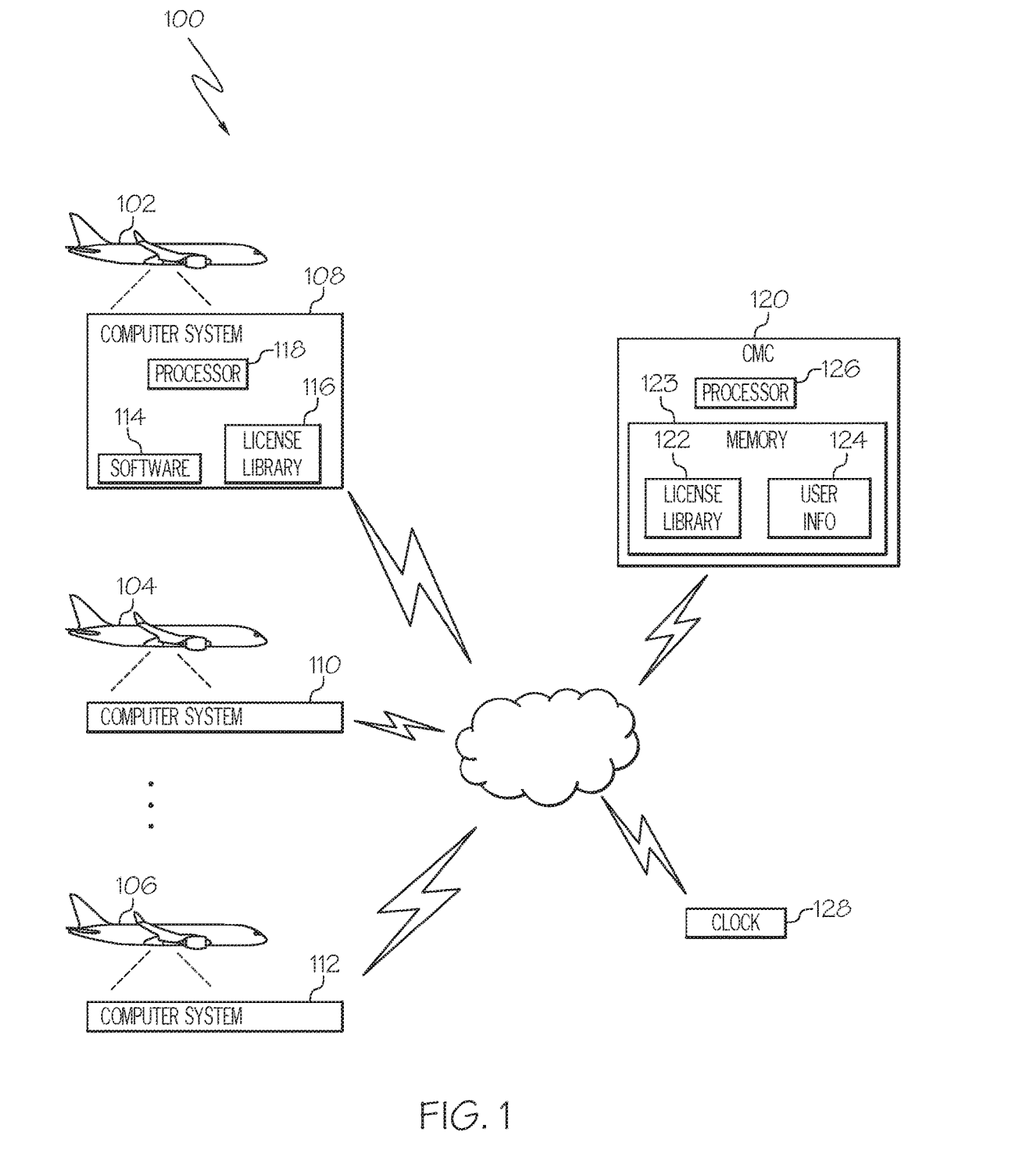
FIG. 1 is a schematic view of a system for managing software licenses according to exemplary embodiments.

FIG. 1 depicts an exemplary embodiment of a system 100 of the present disclosure. The system 100 may be used to distribute, monitor, provide, use, enforce, or otherwise manage a software license. In some embodiments, the system 100 may allow the user to use software under a trial license (i.e., an evaluation license). The system 100 may automatically manage expiration of the trial license in some embodiments. Accordingly, the system 100 may allow users to use and evaluate the software before deciding whether to enter into a more extensive license.

As will be discussed, the system 100 may manage a software license for a vehicle according to a determined operating state of the vehicle. Specifically, in some embodiments, the system 100 may allow user access to a software module (or software feature) when the vehicle is in one operating state, and the system 100 may deny access to the software feature when the vehicle is in another operating state. Stated differently, in some embodiments, the system 100 may allow access to the software, subsequently determine an operating state of the vehicle, and determine when to deny access to the software module based at least partly on the determined operating state of the vehicle.

The system 100 may be configured for use with a variety of vehicle types. As shown in FIG. 1, for example, the system 100 may be configured for use with one or more aircraft. In the embodiment illustrated, a first aircraft 102, a second aircraft 104, and a third aircraft 106 are included. However, it will be appreciated that the system 100 may be employed for any number of aircraft. Also, it will be appreciated that the system 100 may be configured for software management for other types of vehicles (e.g., helicopters, cars, trucks, motorcycles, etc.) without departing from the scope of the present disclosure. The system may also be configured for managing software with a combination of ground-based vehicles as well as aircraft.

Each aircraft 102, 104, 106 may include and/or may have access to a computer system 108, 110, 112. Specifically, the first aircraft 102 may include an onboard computer system 108, the second aircraft 104 may include an onboard computer system 110, and the third aircraft 106 may include an onboard computer system 112. The computer system 108 is shown in detail in FIG. 1 and is shown in even more detail in FIG. 2A. The computer system 108 may be representative of the other computer systems 110, 112 within the system 100. As shown generally in FIG. 1, the computer system 108 may include a processor 118 having access to a respective software bank 114. The software bank 114 may include a plurality of software modules. Each software module may comprise object and source code instructions for running the particular app, feature, etc.

At least some of the software modules stored in the software bank 114 may be propriety and may be licenseable to a user. Such a license may be an agreement between the owner of the aircraft 102 and the software provider in some embodiments. In some embodiments, if a particular software module is licensed, data representing the license may be stored in a license library 116. In some embodiments, the license may be a trial license, allowing the user to try and evaluate the software for a limited, predetermined time period (i.e., license term). In some embodiments, the license may also be a more extended license (i.e., a non-trial license). For example, the trial license may allow the user access to the software module for one week, and if the user so chooses, the user may decide to purchase or otherwise enter into a more extensive license, which allows access to the software module for a longer license term.

The computer systems 108, 110, 112 of the aircraft 102, 104, 106 may be in communication with a remote computer, such as a central maintenance computer (CMC) 120. The CMC 120 may be managed and controlled by the software publisher, the aircraft manufacturer, or otherwise. The CMC 120 may be a computerized device having a processor 126. The CMC 120 may also include computerized memory 123 (e.g., RAM or ROM), which includes a user info module 124 and a license library module 122.

As will be discussed, the computer system 108 may communicate with the CMC 120 to track use of one or more software modules stored in the software bank 114. Specifically, the CMC 120 may track the amount of time that the software module is used, the features that were used, how those features were used, etc. Moreover, the CMC 120 may track the subscription purchasing history for a particular user. That user information may be stored within the user info module 124. Additionally, as will be discussed, the CMC 120 may be used for managing access to one or more software modules stored in the software bank 114.

Additionally, as will be discussed, the CMC 120 may be used to manage a license to one or more software modules utilized by the computer system 108. To this end, data relating to the software license may be stored in the license library module 122 of the CMC 120.

The system 100 may additionally include and/or communicate with a universally coordinated clock 128. The universally coordinated clock 128 may keep time and may be coordinated globally. In some embodiments, the universally coordinated clock 128 may be associated with a Global Positioning System (GPS). The universally coordinated clock 128 may be remote from the computer system 108 of the aircraft 102. As will be discussed, the system 100 may rely directly or indirectly on the clock 128 when determining when the software license commences and/or when the software license expires. As will be discussed, this feature may provide added security for the licensing management system 100. This is because the clock 128 is universally coordinated instead of being manipulable by a user of the software module.

In general, the system 100 may manage a software license within the license library 116. A trial license to an avionics software module will be used as an example. The trial license may allow a crewmember to access, use, and evaluate the software module (i.e., software feature) during the flight. In this example, the software module might be particularly useful for landing the aircraft 102. In this example, even if the trial license is set to expire when the aircraft 102 happens to be landing, the computer system 108 automatically extends the term of the license and continues to allow the user access to the software module. In other words, if expiration of the license and landing of the aircraft 102 coincides, the system may automatically extend the time limit for accessing the software module. More generally, in some embodiments, the system 100 may allow access to the software for a predetermined term, determine the operating state of the aircraft 102, and deny access to the software based on the determined operating state of the aircraft 102.

In some embodiments, the system 100 may be arranged in a server/terminal type of architecture for wireless and remote intercommunication between the computer systems 108, 110, 112 and the CMC 120. The computer systems 108, 110, 112 may be terminals, and the CMC 120 may be a server within this architecture. However, the system 100 may employ another communication architecture in a different embodiment.

Also, in some embodiments, the hardware and software of the computer system 108 may be generally local (i.e., onboard) to the aircraft 102. Also, a majority (e.g., all) of the computing may occur locally. However, it will be appreciated that hardware and/or software described herein and/or shown in the Figures may be remote from the aircraft 102. Likewise, computing that is described herein and/or shown in the Figures may occur remotely (e.g., via cloud computing).

It will be appreciated that the terms "license" and "software license" are used generally herein as an agreement between two parties relating to a software module. In some embodiments, the software license of the present disclosure may be an end user license agreement (EULA). The "term" or "period" of the license may commence at a certain point in time, and the "term" or "period" of the license may expire at a later point in time. When the license commences, the system 100 may allow the user to access the software module. When the license expires, the system 100 may deny the user to access the software module. Although this terminology may have legal definitions under various contract laws, it will be understood that this terminology as used herein may not necessarily fit the respective legal definition.

Figure 2A:
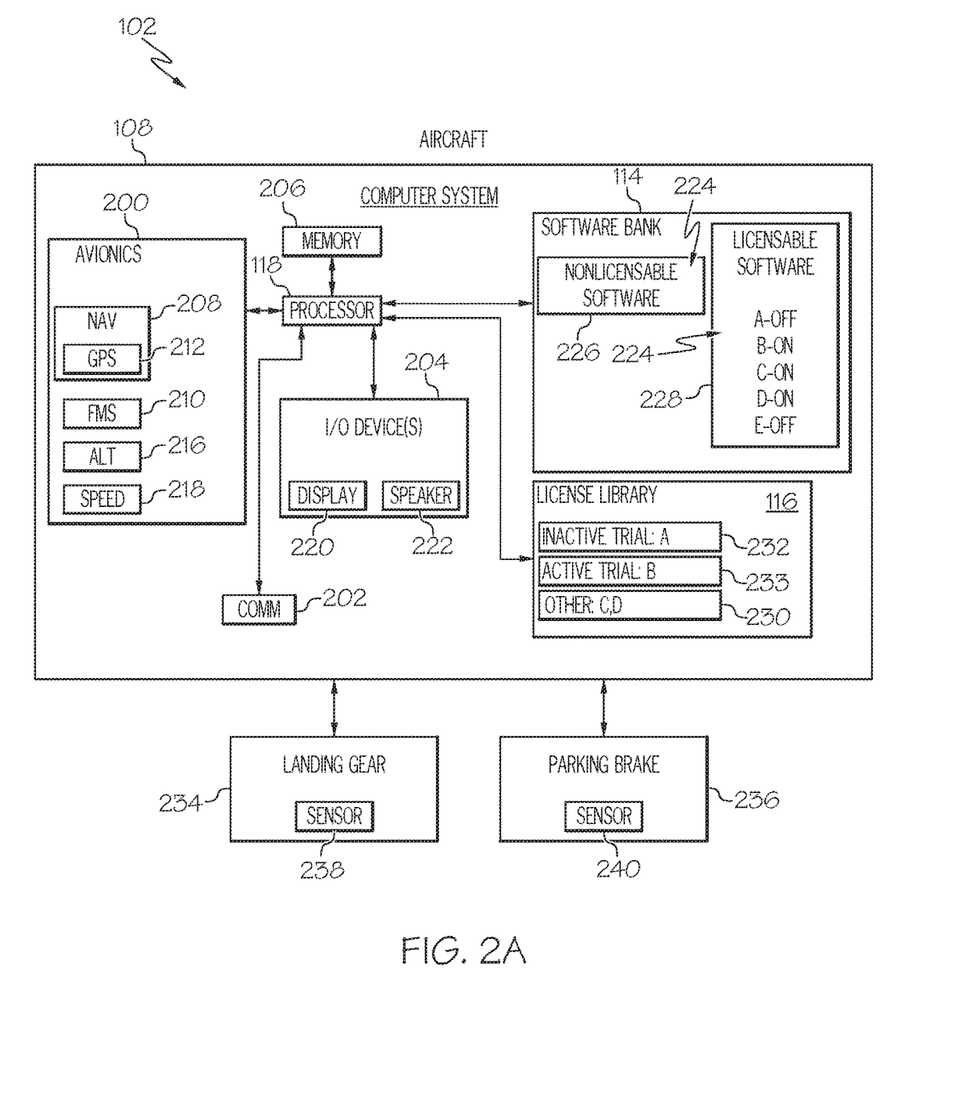
FIG. 2A is a schematic view of an aircraft of the system of FIG. 1 according to exemplary embodiments.

Referring now to FIG. 2A, the computer system 108 of the aircraft 102 is shown in more detail. In an exemplary embodiment, the system 108 includes, without limitation, the processor 118, an avionics module 200, a communications module 202, an input/output (I/O) module 204, a memory 206, the software bank 114 mentioned above, and the license library 116 mentioned above. These components may be suitably configured to support operation of the computer system 108 of the aircraft 102 of FIG. 2A and/or the more extensive system 100 of FIG. 1. These features will each be described in greater detail below. It should be understood that FIG. 2A is a simplified representation of the system 108 for purposes of explanation and ease of description, and FIG. 2A is not intended to limit the application or scope of the subject matter in any way. Practical embodiments of the system 108 may vary from the illustrated embodiment without departing from the scope of the present disclosure. Also, the system 108 may include numerous other devices and components for providing additional functions and features, as will be appreciated in the art.

In some embodiments, the computer system 108 may be in communication with other subsystems of the aircraft 102 via a wired connection or a wireless connection. For example, the computer system 108 may be in communication with a landing gear 234 of the aircraft 102 via a CAN bus connection. The landing gear 234 may be variable between a first retracted position and a second deployed position. A sensor 238 may be included for observing whether the landing gear 234 is in the retracted or deployed positions. In some embodiments, the sensor 238 may be a proximity switch for observing the proximity of the landing gear 234 (i.e., observing the distance between the sensor 238 and the landing gear 234). The proximity switch may output one signal when it observes the landing gear 234 in the retracted position and may output a different signal when it observes the landing gear 234 in the deployed position. The signals from the proximity switch may be communicated to the processor 118 so that the processor 118 determines the position of the landing gear 234. In additional embodiments, the sensor 238 may observe the weight exerted on the landing gear 234 (a so-called "weight-on-wheels" sensor) and communicate a corresponding signal to the processor 118. Accordingly, the processor 118 may determine the weight load on the landing gear 234. It will be appreciated that the landing gear 234 is likely to be retracted when the aircraft 102 is airborne (e.g., during the climbing, cruising, descent, and/or approach operating states). Conversely, the landing gear 234 is likely to be deployed when the aircraft 102 is close to ground or on-ground (e.g., during the standing, pushback, towing, taxiing, takeoff, and/or landing operating states). Thus, the sensor 238 may be used to observe and detect whether the aircraft 102 is airborne or on-ground as will be discussed below.

Additionally, the computer system 108 may be in wired or wireless communication with a sensor 240 of a parking brake 236 of the aircraft 102. The parking brake 236 may be moveable between a first disengaged position and a second engaged position. The sensor 240 may be included for observing whether the parking brake 236 is in the disengaged or engaged position. In some embodiments, the sensor 240 may be a proximity switch that observes the proximity of a component of the parking brake 236 (i.e., by observing a distance between the sensor 240 and the parking brake 236). The sensor 240 may output different signals to the processor 118 based on whether the parking brake 236 is in the disengaged or engaged position. Accordingly, the processor 118 may determine whether the brake 236 is in the disengaged or engaged position. In an additional embodiment, the sensor 240 may be an electrically resistive switch. The parking brake 236 may be connected in an electrical circuit with the resistive sensor 240, and the resistance in the circuit may change depending on whether the parking brake 236 is in the disengaged or engaged positions. Accordingly, the resistive sensor 240 may observe the resistance in the circuit and communicate a corresponding signal to the processor 108. It will be appreciated that the parking brake 236 is likely to be disengaged when the aircraft 102 is airborne. Conversely, the parking brake 236 is likely to be engaged when the aircraft 102 is on-ground. Thus, the sensor 240 may be used to detect whether the aircraft 102 is airborne or on-ground as will be discussed below.

The processor 118 of the computer system 108 generally represents the hardware, software, and/or firmware components configured to facilitate communications and/or interaction between the avionics module 200, the communications module 202, the I/O module 204, the memory 206, the software bank 114, the license library 116, and/or other elements of the system 108. The processor 118 may also perform additional tasks and/or functions described in greater detail below. Depending on the embodiment, the processor 118 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 118 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 118 includes processing logic that may be configured to carry out the functions, techniques, and processing tasks associated with the operation of the system 108 of the aircraft 102 as well as the larger system 100 represented in FIG. 1. Furthermore, the steps of a method or algorithm described in connection with the embodiments disclosed herein may be embodied directly in hardware, in firmware, in a software module executed by the processor 118, or in any practical combination thereof. In some embodiments, the features and/or functionality of the processor 118 may be implemented as part of the avionics module 200 (e.g., as part of the navigation system 208 or FMS 210) as will be appreciated in the art.

The avionics module 200 may be operable for obtaining and/or providing real-time flight-related information. Accordingly, the avionics module 200 may include one or more sensors that detect this real-time information. Specifically, the avionics module 200 may include an altimeter 216 that observes the current altitude of the aircraft 102. Also, the avionics module 200 may include an airspeed sensor 218 that observes the current airspeed of the aircraft 102. The altimeter 216 and the airspeed sensor 218 may observe the respective parameters of the aircraft 102 and generate corresponding sensor signals based thereon. These signals may be transmitted over a communication architecture (that facilitates the transfer of data, commands, power) to the processor 118. The processor 118 may receive and process these signals to determine the operating state of the aircraft 102 as will be discussed in detail below.

In some embodiments, the system 108 and/or aircraft 102 may additionally include one or more of the following avionics systems suitably configured to support operation of the aircraft 102: an air traffic management system, a radar system, a traffic avoidance system, an enhanced ground proximity warning system, an autopilot system, an auto-thrust system, a flight control system, a weather system, an electronic flight bag and/or another suitable avionics system.

In an exemplary embodiment, the avionics module 200 may include or may be associated with a navigation system 208. The navigation system 208 is configured to obtain one or more navigational parameters associated with operation of the aircraft 102. The navigation system 208 may be realized as a global positioning system (GPS) 212. The GPS system 212 may be a known system for determining the global position of the aircraft 102. In some embodiments, the GPS system 212 may communicate with the universally coordinated clock 128 (FIG. 1) so that the computer system 108 may determine the actual time as will be discussed in detail below. In addition, or in the alternative, the navigation system 208 may be realized as an inertial reference system (IRS). The navigation system 208 may also be realized as a radio-based navigation system (e.g., VHF omni-directional radio range (VOR) or long range aid to navigation (LORAN)). Furthermore, the navigation system 208 may include one or more navigational radios or other sensors suitably configured to support operation of the navigation system 208, as will be appreciated in the art.

Furthermore, in an exemplary embodiment, the avionics module 200 may include or may be associated with a flight management system (FMS) 210. In an exemplary embodiment, the flight management system 210 maintains information pertaining to a current flight plan (or alternatively, a current route or travel plan). In accordance with one or more embodiments, the flight management system 210 (or another avionics system 200) is configured to determine, track, or otherwise identify the current operating state (e.g., flight phase or phase of flight) of the aircraft 102, as described in greater detail below. Various operating states of the aircraft 102 are well known (e.g., a standing phase, a pushback or towing phase, a taxiing phase, a takeoff phase, a climbing phase, a cruising phase, a descent phase, an approach phase, a landing phase, and the like) and will not be described in detail herein. It should be noted that one or more of these phases may be combined and/or categorized in numerous possible manners and/or each phase of flight may comprise numerous sub-phases (for example, an approach phase may include sub-phases for holding, procedure turn, flyover, orbit, and the like), and the subject matter is not intended to be limited to any particular number and/or classification of flight phases. In addition to delineated flight phases, the flight management system 210 may identify other operating states of the aircraft 102, such as, for example, operation with one or more engines disabled, operation when afterburners onboard the aircraft 102 are being utilized, transonic and/or supersonic operation of the aircraft 102, and the like. In reality, some operating states may not necessarily be entirely distinct from each other, and one state may overlap with one another.

The communication module 202 may include one or more communication systems. The communication module 202 may be configured to provide wired and/or wireless intercommunication between different components of the aircraft 102. The communication module 202 may also provide wireless communication with the CMC 120, the clock 128, and/or the other aircraft 104, 106. The communication module 202 may be realized by radio communication, radar communication, laser communication, or otherwise. In some embodiments, the communication module 202 may encrypt and decrypt messages exchanged between the computer system 108 and the CMC 120, the clock 128, and/or the other aircraft 104, 106.

The I/O module 204 may include one or more input devices that allow the user to provide a user input (e.g., a user command) into the system 108. For example, in some embodiments, the input device of the I/O module 204 may be realized by a keyboard, a mouse, a touch-sensitive surface, a stylus, or other input device. Also, in some embodiments, the I/O module 204 may include one or more output devices that provide output to the user. In some embodiments, the output device of the I/O module 204 may be realized by a display 220 and/or a speaker 222. The speaker 222 may be a conventional speaker that provides audio output from the I/O module 204. The display 220 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 220 may additionally be implemented as a panel mounted display, a HUD (head-up display) projection, a head-mounted display, a near-to-eye (NTE) display, and/or any one of numerous known technologies. It is additionally noted that the display 220 may be configured as any one of numerous types of aircraft flight deck displays. For example, it may be configured as a multi-function display, a horizontal situation indicator, a vertical situation indicator (VSD), or an interactive navigational display (iNAV). Also, the display 220 may be configured as a primary flight display (PFD). Furthermore, the display 220 may be coupled to the processor 118, and the processor 118 and the display 220 may be cooperatively configured to display, render, or otherwise convey one or more graphical representations or images associated with operation of the aircraft 102 on the display 220. It will be appreciated that although FIG. 2A shows a single display 220, in practice, additional display devices may be included in the system 108.

The memory 206 may be realized as RAM memory, flash memory, EPROM memory, EEPROM memory, registers, a hard disk, a removable disk, a CD-ROM, or any other form of storage medium known in the art. In this regard, the memory 206 can be coupled to the processor 118 such that the processor 118 can read information from, and write information to, the memory 206. In the alternative, the memory 206 may be integral to the processor 118. As an example, the processor 118 and the memory 206 may reside in an ASIC. In practice, a functional or logical module/component of the display 220 might be realized using program code that is maintained in the memory 206. In some embodiments, the memory 206 may include a terrain database, an obstacle database, a navigational database, a geopolitical database, a terminal airspace database, a special use airspace database, or other information for operations of the avionics module 200.

Moreover, the software bank 114 (mentioned above) may include a plurality of software modules 224. The software modules 224 are each configured to provide a programmed function/feature. The software modules 224 may each include programming code (e.g., source code and object code) for executing at least one aspect of the programmed functionality. Each software module 224 may be an individual program, app, software suite, software package, software feature, etc. It will, thus, be appreciated that the term "software module" is used generally herein and may refer to any suitable delineation of software. In some embodiments, these software modules 224 may be utilized by the processor 118 to generate control commands for displaying information on the display 220, for outputting audible information from the speaker 222, and/or for controlling another system of the aircraft 102.

In FIG. 2A, the software modules 224 within the software bank 114 are grouped according to licensability. In other words, the software bank 114 of the computer system 108 may include nonlicenseable software modules 226 and licenseable software modules 228. The nonlicenseable software modules 226 may be mandatory software that is mandated by the U.S. Federal Aviation Administration (FAA) or other governing body. In contrast, the licenseable software modules 228 may be optional software that, in some embodiments, is intended to enhance, enable, or facilitate certain operations of the aircraft 102. Thus, access to the licenseable software modules 228 may be subject to a respective license agreement.

In some embodiments, the licenseable software modules 228 may be used in connection with the navigation system 208, the flight management system 210, or other features of the avionics module 200. Specifically, the licenseable software modules 228 may include avionics tools, visualization tools, cockpit display of traffic information (CDTI) tools, Smart View, 2D airport moving maps, Data Driven Chart, and/or other software products that are commercially available from Honeywell International, Inc. having headquarters in Morris Plains, N.J., USA.

The license library 116 (mentioned above) may include various files containing data corresponding to the license terms for one or more of the licenseable software modules 228. In FIG. 2A, the licenses within the license library 116 are organized into inactive trial licenses 232, active trial licenses 233, and other non-trial licenses 230. In some embodiments, for example, the file for each license within the license library 116 may include an indicator (e.g., flag) that distinguishes whether it is an inactive trial license 232, an active trial license 233, or a non-trial license 230.

The trial licenses 232, 233 may allow use only for a trial period (with a start date and an expiration date defined within the respective trial license 232, 233). In some embodiments, a licensee may enter into these licenses 232, 233 for free. In contrast, the other non-trial licenses 230 may allow use for a longer period. In some embodiments, a licensee may enter into the non-trial license 230 by purchasing a subscription or by transferring another type of consideration to the licensor. In some cases, the license period for the non-trial license 230 is longer than that of the trial licenses 232, 233.

In the illustrated embodiment, the inactive trial licenses 232 have not commenced (i.e., have not been activated), meaning that the trial license 232 is available but no agreement has been formed. In contrast, the active trial licenses 233 have commenced (i.e., have been activated), meaning that the rights under the trial license 233 have transferred to the licensee, but those rights will expire at the expiration time set forth in the license 233. The other non-trial licenses 230 have commenced and are currently active (e.g., a subscription to those licenses 230 have been purchased).

In the illustrated example of FIG. 2A, there are five licenseable software modules 228 represented. Specifically, a first software module A, a second software module B, a third software module C, a fourth software module D, and a fifth software module E are shown. However, there may be any number and any type of licenseable software modules 228 included without departing from the scope of the present disclosure.

The first software module A is unlicensed in this example as indicated by the word "OFF". A corresponding inactive trial license 232 for the first software module A is stored in the license library 116 as shown in FIG. 2A. The second software module B is licensed in this example as indicated by the word "ON". An active trial license 230 for the second software module B is stored in the license library 116. The third and fourth software modules C, D are licensed, and non-trial licenses are stored in the license library 116 for each. Furthermore, the fifth software module E remains unlicensed, and there is no corresponding license stored in the license library 116 in the embodiment of FIG. 2A. It could be that the license for software module E is missing. It could also be that the license for the software module E was used and evaluated previously under a trial license, and the user decided against purchasing a more extensive (i.e., non-trial) license for the software module E. Accordingly, while the software module E is present within the software bank 114, the software remains inaccessible to the user because there is no available license for use of the software module E.

The following discussion will relate substantially to management of the trial licenses 232, 233. Specifically, the systems and method of the present disclosure may be employed for managing the expiration of these trial licenses 232, 233. However, it will be appreciated that the systems and methods of the present disclosure may be employed for managing other aspects of the licenses 232, 233. Also, it will be appreciated that the systems and methods may be employed for managing the other non-trial licenses 230 as well without departing from the scope of the present disclosure.

It will be appreciated that the trial licenses 232, 233 may have a dictated period or term with a dictated start and expiration. The expiration of the trial licenses 232, 233 may be expressed as a specified time and date (The expiration date and time will be collectively referred to herein as a "time limit"). The expiration time limit may be expressed as a predetermined time limit measured from the start of the trial license 232, or otherwise. In some embodiments, for example, at least one trial license 232, 233 may have a period of two weeks (e.g., once the trial license 232, 233 commences, the expiration time limit of the trial license 232 will be set at two weeks from the start). The expiration time limit may be based on Universal Coordinated Time (UCT) (a.k.a., Zulu time) as dictated by the clock 128.

Additionally, one or more of the trial licenses 232, 233 may include the respective aircraft type, a software module key, the rights granted under the license type (e.g., a grant of right to use, display, and/or perform the respective software module 228), and a sub-feature list and/or other information for the particular trial license 232, 233.

Moreover, the trial licenses 232, 233 may be data loadable from the remote license library module 122 of the CMC 120 (FIG. 1). In some embodiments, a copy of the trial licenses 232, 233 may be saved in the remote license library module 122. Copies of the licenses 232, 233 may be field loadable to the local license library 116 using any standard data load mechanism (e.g., wireless, wired, or portable storage device (SD card, etc.).

The trial licenses 232, 233 may be encrypted and/or CRC protected. Furthermore, the trial licenses 232, 233 may be specific to the particular aircraft 102, or specific to a fleet of a particular aircraft type. The licenses 232, 233 may be generated and controlled by the software publisher, aircraft manufacturer, etc.

Figure 2B:
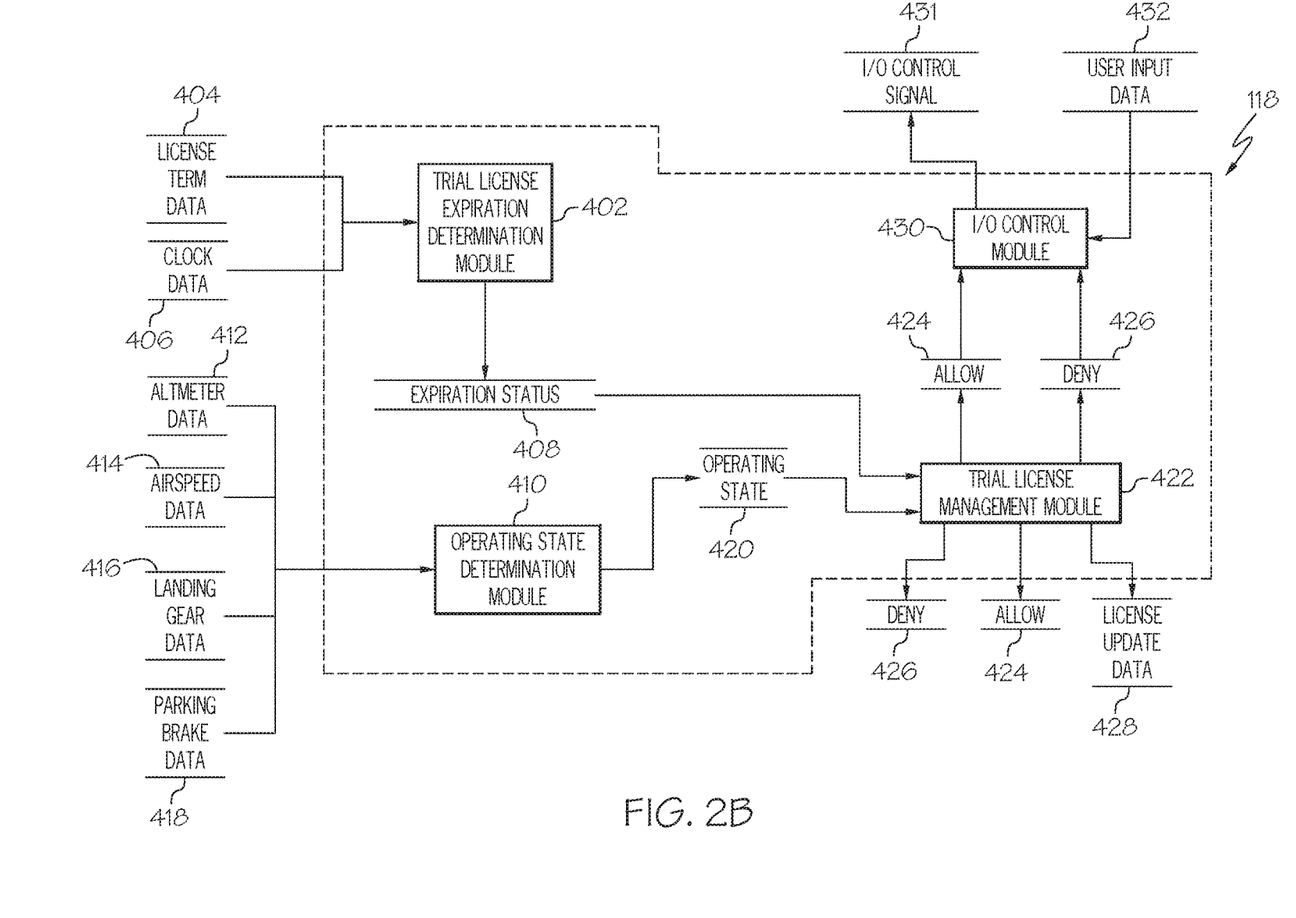
FIG. 2B is a dataflow diagram of the system of FIG. 2A according to exemplary embodiments.

Referring now to FIG. 2B, a dataflow diagram for the computer system 108 of FIG. 2A and/or the system 100 of FIG. 1 is illustrated according to example embodiments. As shown in FIG. 2B, the processor 118 may include a trial license expiration determination module 402, which may receive license term data 404 from the license library 116. In some embodiments, the license term data 404 includes, indicates, and/or corresponds to the term of the respective license. In other words, the license term data 404 may dictate when the respective license commences and expires. With regard to expiration, the license term data 404 may include an expiration time limit when a particular trial license is set to expire. The trial license expiration determination module 402 may also receive clock data 406. The clock data 406 may indicate the current time. The clock data 406 may be based on the current time as dictated by the universally coordinated clock 128. The trial license expiration determination module 402 may compare the current time included in the clock data 406 to the expiration time limit included in the license term data 404 to determine an expiration status 408 of the license (i.e., to determine whether the respective license is set to expire). In other words, the expiration determination module 402 may perform this comparison to determine if the current time matches the expiration time limit for the particular trial license. If there is a match, the trial license expiration determination module 402 outputs expiration status data 408 that indicates that the trial license is set to expire.

The processor 118 may additionally include an operating state determination module 410, which is configured to determine the current operating state of the aircraft. In some embodiments, the operating state determination module 410 may determine whether the aircraft is airborne or on-ground according to conditions that are observed by one or more sensors (e.g., the altimeter 216, the airspeed sensor 218, the landing gear sensor 238, and/or the parking brake sensor 240).

In the embodiment illustrated in FIG. 2B, for example, the operating state determination module 410 may receive altimeter data 412 (indicative of the current altitude of the aircraft 102) from the altimeter 216. The operating state determination module 410 may also receive airspeed data 414 (indicative of the current airspeed of the aircraft 102) from the airspeed sensor 218. Additionally, the operating state determination module 410 may receive landing gear data 416 (indicating whether the landing gear is retracted or deployed and/or the weight load on the landing gear) from the landing gear sensor 238. Furthermore, the operating state determination module 410 may receive parking brake data 418 (indicating whether the parking brake is engaged or disengaged) from the parking brake sensor 240. As will be discussed, the operating state determination module 410 may receive and process the altimeter data 412, the airspeed data 414, the landing gear data 416, and/or the parking brake data 418 to determine whether the aircraft 102 is airborne or on-ground. Based on this determination, the operating state determination module 410 may output operating state data 420, which indicates whether the aircraft 102 is airborne or on-ground.

The processor 118 may further include a trial license management module 422. The trial license management module 422 may receive and process the expiration status data 408 and the operating state data 420 to determine whether to allow access to the software under the trial license or whether to deny access under the trial license. When the trial license management module 422 determines to allow access, the trial license management module 422 may output an "allow" signal 424. Conversely, when the trial license management module 422 determines to deny access, the trial license management module 422 may output a "deny" signal 426.

The "allow" signal 424 and "deny" signal 426 may be output to various other components, such as components that operate according to the software modules. For example, these signals 424, 426 may be output to an I/O control module 430 of the processor 118. The I/O control module 430 may generally output an I/O control signal 431 for controlling the I/O devices 204. Also, in some embodiments, the I/O control module 430 may receive user input data 432 (e.g., a user command), indicating that the user would like to run a particular software module. If the I/O control module 430 receives an allow signal 424 for that software, the I/O control module 430 may output the I/O control signal 431 to run the software module. However, if the I/O control module 430 receives a deny signal 426 for that software, the I/O control module 430 may not output the I/O control signal 431, thereby blocking the user's access to the software. In some embodiments, the I/O control signal 431 may also cause the display 220 to show the software feature when the allow signal 242 is received for that software feature, and the I/O control signal 431 may cause the display 220 to hide the software feature when the deny signal 244 is received for that software feature. Furthermore, the trial license management module 422 may output the allow signal 424 and the deny signal 426 to other components that run the software (e.g., the avionics module 200, etc.). Moreover, the trial license management module 422 may output license update data 428. For example, as will be discussed, the trial license management module 422 may extend the trial license based on the operating state of the aircraft, and this extension may be reflected in the license update data 428. The license update data 428 may be output to and received by the license library 116 as will be discussed.

Figure 3:
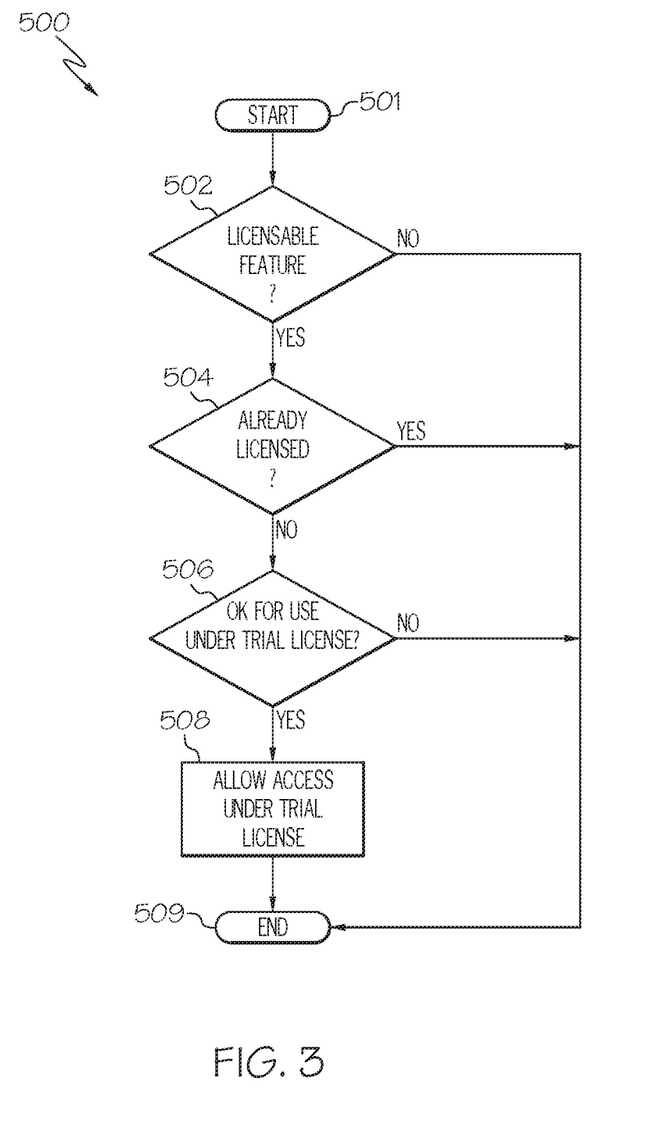
FIG. 3 is a flowchart illustrating a method of configuring software of the aircraft of FIG. 2A according to exemplary embodiments.
Figure 4:
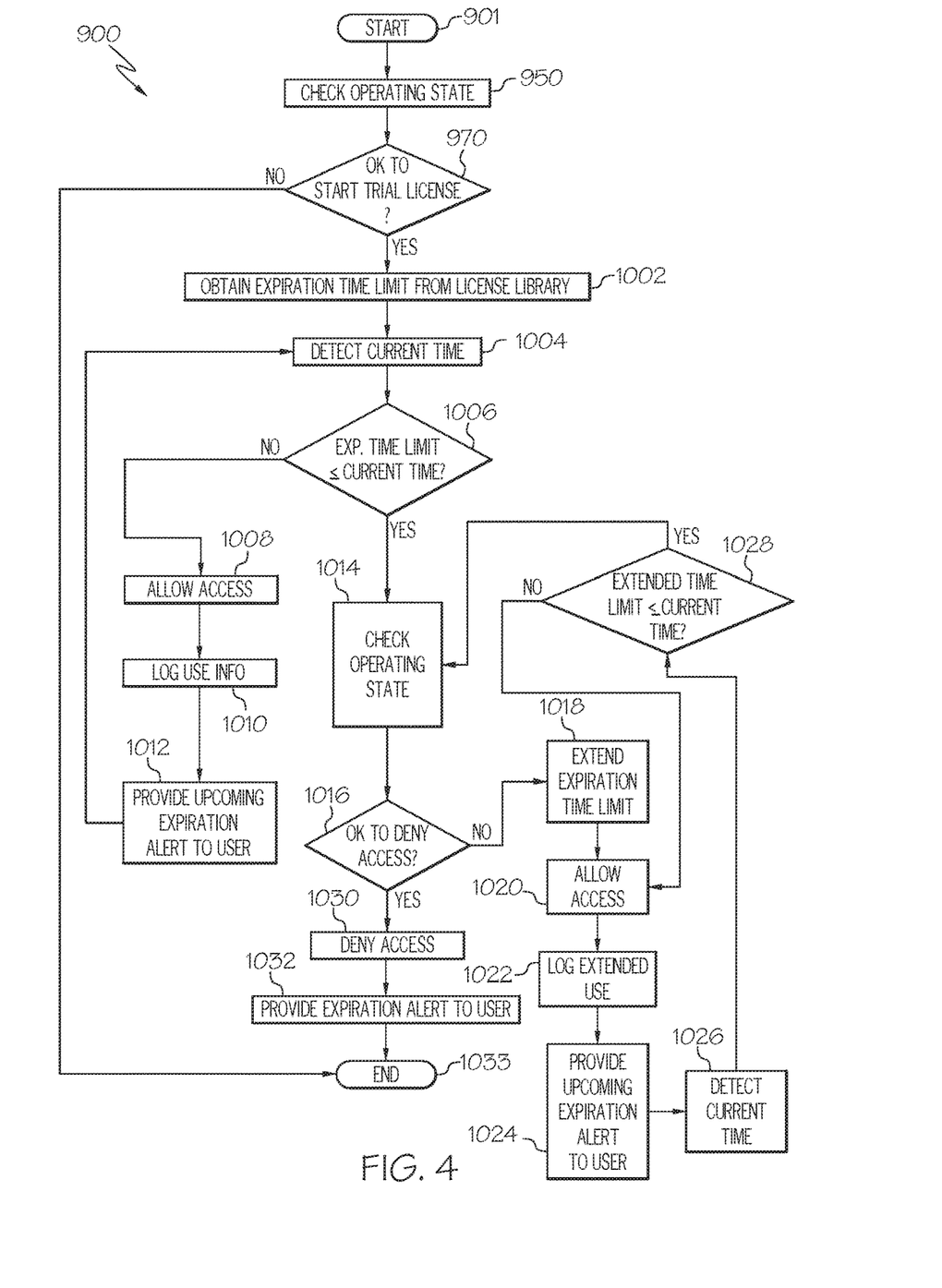
FIG. 4 is a flowchart illustrating a method of managing a software module under a trial license using the system of FIG. 1.

Referring now to FIGS. 3 and 4, one or more methods of operating the computer system 108 of FIG. 2A, the larger system 100 of FIG. 1, and methods for managing licenses to the software modules are illustrated according to exemplary embodiments. In the following discussion, it will be assumed that the computer system 108 of the aircraft 102 employs the methods of FIGS. 3 and 4 when powering up the computer system 108. In general, FIG. 3 shows a method 500 of configuring the software modules 224, 228 included in the software bank 114. Through this method 500, the processor 118 may identify which software module might be available for use under a trial license, and if a trial license is appropriate for the particular software module, the method 900 of FIG. 4 may follow.

The method 500 of FIG. 3 may be a method of configuring the software modules 224 stored within the software bank 114 of FIG. 2A. In some embodiments, the method 500 may be largely conducted by the processor 118. In other words, the processor 118 may conduct configuration management of the software modules 224 stored within the software bank 114 according to the method 500 of FIG. 3. The processor 118 may configure at least some and, in some embodiments, all of the software modules 224 one-by-one according to the method 500. Thus, in some embodiments, the processor 118 may repeat the method 500 for each software module 224.

The method 500 may begin at 501. At 502, the processor 118 may consider one of the software modules 224 and determine whether it is licenseable or not. If the particular software module is not licenseable (i.e., the software is nonlicenseable software 226), the method 500 may terminate at 509. If, however, the particular software module is licenseable (i.e., the software is licensable software 228), the method may continue to 504.

At 504, the processor 118 may communicate with the license library 116 and determine whether the particular licenseable software module 228 is already licensed under a non-trial license 230 (e.g., a subscription has been purchased for the software module). If the software is already licensed under a non-trial license 230 (e.g., when either software module C or D is being considered at 504), the method 500 may terminate. If, however, the software is not already licensed under a trial license 230 (e.g., when either software module A, B, or E), the method 500 may continue at 506.

Next, at 506, the processor 118 may determine whether the particular software module 228 is available for use under a trial license. In other words, the processor 118 may communicate with the license library 116 and determine the status of all available trial licenses 232, 233 for the particular software module 228. In some embodiments of 506, the processor 118 may determine whether there is any corresponding trial license 232, 233 for the particular software module 228. If so, the processor 118 may determine whether it is subject to an active trial license 213 (e.g., like software module B) or whether there is an inactive one available (e.g., like software module A). Under these considerations, software module E would be unavailable for use under a trial license, since there is no trial license available in the license library 116, and the method 500 would terminate. However, software modules A and B would be available for use under the respective trial licenses 232, 233, and the method 500 would continue at 508.

At 508, the processor 118 may allow access to the particular software module under the corresponding trial license 232, 233. In the case of software module A, for example, the I/O module 204 may provide an alert (e.g., visual information on the display 220) informing the user that the software module A is now available for use under the respective trial license 232. In some embodiments, the trial license may require user input before the trial license period commences. In other words, if the user chooses to enter into the trial license 232, the system 108 requires acceptance of one or more terms. If the user chooses to enter into the software license, software module A may change status from inactive trial license 232 to an active trial license 233. In some embodiments, the processor 118 may update the license library 116, for example, by re-filing the software license as an active trial license 233, by writing to the license library 116 to document the change in status, or otherwise. Also, in some embodiments, the processor 118 may communicate with the CMC 120 via the communications module 202, and the CMC 120 may update its license library module 122 to reflect the start of the trial license for software module A.

In the case of software module B, the system 108 may continue to allow use under the active trial license 233. This would allow the user to continue evaluating the merits of the software module B. The method 500 may terminate at 509.

Referring now to FIG. 4, additional features of the present disclosure are illustrated. A method 900 of managing a software license is illustrated according to additional embodiments. The method 900 may be employed for managing a trial license, such as the inactive trial license 232 of software module A and/or the active trial license 233 of software module B. In some embodiments, the method 900 of FIG. 4 may occur subsequent to the method 500 of FIG. 3. However, it will be appreciated that either one of the methods 500, 900 may be employed without the other.

Initially, in the discussion of FIG. 4, it will be assumed that the method 900 is employed for the inactive trial license 232 of software module A. Additionally, for the sake of discussion, it will be assumed that software module A is an avionics software module A intended for use when the aircraft 102 is aloft, airborne, etc. For example, software module A may be a feature that is used in association with the avionics module 200 and may assist the pilot or other crewmember when landing the aircraft 102.

The method 900 may be employed for managing the trial license 232 according to the current operating state of the aircraft 102. For example, in some embodiments, the system 100 may determine when to allow access and/or deny access to a software module based on the current operating state of the aircraft 102. For example, the system 100 may determine the start and/or end of the trial license 232 based on whether the aircraft 102 is airborne or on the ground. In additional embodiments, the system 100 may determine the start and/or end of the trial license 232 based on an observed airspeed of the aircraft 102. Furthermore, the system 100 may determine the start and/or end of the trial license 232 based on an observed altitude of the aircraft 102.

Thus, where the software module A is an avionics software feature that assists in landing the aircraft 102, the method 900 may be employed to ensure that the software feature remains accessible and useable during flight. In other words, the method 900 may be employed to prevent expiration of the software license 232 during flight. Accordingly, the method 900 may allow the crewmember to use the software module A under the trial software license 232 in real-word conditions (i.e., during flight). This makes the trial license 232 more useful in showcasing the software module, and/or increases the chances that the user will ultimately purchase a more extensive license to the software module A. Moreover, as will be discussed, there may be one or more features that inhibit the user's ability to tamper with the license for gaining unauthorized access to the software module.

As stated, the method 900 may be used in managing the end of the license 232 (i.e., determining when to deny access to the software module A). In this regard, the processor 118 may determine an expiration time limit for the license 232, allow access to the software module A before that expiration time limit, and deny access to the software module A at the expiration time limit and afterward. In some embodiments, the processor 118 may determine the expiration time limit according to a detected operating state of the aircraft 102. For example, if the processor 118 determines that the aircraft 102 is airborne (i.e., a first operating state), the processor 118 may use a first (predetermined) expiration time limit for the license 232. Conversely, if the processor 118 determines that the aircraft 102 is on ground (i.e., a second operating state), the processor 118 may use an extended expiration time limit for the license 232. Also, as will be discussed, the processor 118 may extend (i.e., increase) the first expiration time limit by a predetermined time interval to determine the extended expiration time limit for the license 232.

The method 900 may begin at 901. At 950, the operating state determination module 410 of the processor 118 may determine the current operating state of the aircraft 102. Specifically, in this example, the processor 118 determines whether the aircraft 102 is on-ground or whether the aircraft 102 is airborne.

For example, to determine whether the aircraft 102 is on-ground or airborne, the processor 118 may communicate with the altimeter 216 to determine the current altitude of the aircraft 102. The processor 118 may compare the current altitude (as observed by the altimeter 216) to a predetermined threshold altitude. If the current altitude is below the predetermined threshold (e.g., below 1000 feet), the processor 118 may determine that the aircraft is on-ground. If the altitude is above the threshold, the processor 118 may determine that the aircraft is airborne.

Similarly, the operating state determination module 410 of the processor 118 may communicate with the airspeed sensor 218 to determine the current airspeed of the aircraft 102. The processor 118 may compare the current airspeed (as observed by the airspeed sensor 218) with a predetermined threshold speed. If the airspeed is below the predetermined threshold, the processor 118 may determine that the aircraft is on-ground. Conversely, if the detected airspeed is above the threshold, the processor 118 may determine that the aircraft is airborne.

Moreover, the processor 118 may communicate with the sensor 238 to determine the condition of the landing gear 234. If the landing gear 234 is deployed, the processor 118 may determine that the aircraft is on-ground. If the landing gear 234 is retracted, the processor 118 may determine that the aircraft is airborne. In additional embodiments, the processor 118 may receive the "weight-on-wheels" from the landing gear sensor 238. If the weight on wheels is below a predetermined threshold, the processor 118 may determine that the aircraft 102 is on-ground. Conversely, if the weight on wheels is above a predetermined threshold, the processor 118 may determine that the aircraft 102 is airborne.

Additionally, the processor 118 may communicate with the sensor 240 to determine the position of the parking brake 236. If the parking brake 236 is engaged, the processor 118 may determine that the aircraft 102 is on ground. If the parking brake 236 is disengaged, the processor 118 may determine that the aircraft 102 is airborne.

In some embodiments of 950, the processor 118 determines whether the aircraft 102 is airborne or on-ground based on input from the altimeter 216, the speed sensor 218, the landing gear sensor 238, and the parking brake sensor 240. This redundancy may ensure accuracy of the determination made at 950. In other embodiments, the method 900 may rely on a single input (i.e., input from the altimeter 216, the speed sensor 218, the landing gear sensor 238, or the parking brake sensor 240). Other aircraft may not include a parking brake and, thus, instead of input from a parking brake sensor, the operating state of the aircraft 102 may be determined based on another source (e.g., the altimeter 216, the speed sensor 218, and/or the landing gear sensor 238). Thus, it will be appreciated that the operating state of the aircraft 102 may be determined in a variety of ways without departing from the scope of the present disclosure.

Next, at 970, the processor 118 may determine whether the operating state detected at 950 is acceptable for starting the trial license 232. In some embodiments, if the aircraft 102 is detected as being airborne, a negative determination is made at 970, and the method 900 may terminate. In this example, the license for software module A would remain inactive. In contrast, if the aircraft 102 is detected as being on-ground, a positive determination is made at 970, the trial software license may commence, and the method 900 may continue to 1002.

At 1002, the processor 118 may communicate with the license library 116 and obtain the expiration time limit from the software license 232 of software module A. In some embodiments, the software license 232 may dictate the expiration time limit as a particular time (e.g., 12:00 AM, Jan. 1, 2020). In other embodiments, the software license 232 may dictate the expiration time limit as being a particular time interval after the start of the license 232 (e.g., 20 days after the start of the license 232).

At 1004, the system 100 may detect the current time 1004. In some embodiments, the GPS 212 of the navigation system 208 may communicate with the universally coordinated clock 128 to obtain the current time at 1004 and communicate corresponding clock data 406 to the expiration determination module 402 of the processor 108.

At 1006, the processor 118 may compare the expiration time limit obtained at 1002 to the current time detected at 1004. In some embodiments, the processor 118 may determine whether the expiration time limit is less than or equal to the current time 1006.

If the expiration time limit is greater than the current time 1006 (negative determination at 1006), the trial license is still active in this example. Accordingly, the method 900 may continue to 1008, and the system 100 may continue to allow access to the software module A. Next, the method 900 may continue to 1010 and the system 108 may communicate with the CMC 120 so that use of the software module A may be gathered and saved. For example, the CMC 120 may track the amount of use, track what features are used, and the like. Next, at 1012, the system 100 may provide an alert or other notification regarding the expiration of the trial license 232. In some embodiments, for example, the processor 118 may provide a visual alert on the display 220 and/or an audio alert using the speaker 222. In some embodiments, the system 100 may provide the alert at a predetermined time before the expiration time limit obtained at 1002 (e.g., five days before the expiration time limit). This alert may be provided repeatedly (e.g., every day until the expiration time limit). The alert may be accompanied by information about purchasing a more extensive license to the software module A. For example, payment information, details about the more extensive license, or other information may be provided. After the alert is provided at 1012, the method 900 may loop back to 1004, and the current time may be again detected. It will be appreciated that the method 900 may cycle through 1006, 1008, 1010, and 1012 until, at 1006, the expiration time limit is less than or equal to the current time (i.e., until the license 232 is set to expire).

Once the license 232 is set to expire (i.e., 1006 of the method answered affirmatively), the method 900 may continue at 1014. At 1014, the operating state of the aircraft 102 may be checked. This determination may be similar to the check performed at 950 and described above. Accordingly, the processor 118 may determine whether the aircraft is airborne or on-ground based on input from the altimeter 216, the speed sensor 218, the landing gear sensor 238, and/or the parking brake sensor 240.

Next, at 1016 it is determined the processor 118 may determine whether the operating state detected at 1014 is acceptable for ending the trial license 232. In the current example, the determination of 1016 is dependent on whether the aircraft 102 is airborne or on-ground.

If it is determined that the aircraft 102 is airborne, the method 900 may continue to 1018, and the license 232 is extended past the previously determined expiration time limit. In some embodiments, at 1018 the processor 118 extends the expiration time limit that was obtained at 1002 by a predetermined time interval (e.g., extend expiration by 1 day). The method 900 may continue to 1020, wherein the processor 118 continues to allow access under the trial license 232 (i.e., an extended trial license). The method 900 may continue to 1022 and the system 108 may communicate with the CMC 120 so that use of the software module A may be gathered and saved. For example, the CMC 120 may track the amount of extended use, track what features are used during this extended trial license period, and the like. At 1024, the system 100 may provide an alert or other notification regarding the expiration of the trial license 232. In some embodiments, for example, the processor 118 may provide a visual alert on the display 220 and/or an audio alert using the speaker 222. In some embodiments, the system 100 may continuously and/or repeatedly provide the alert at predetermined time intervals (e.g., every five hours). The alert may be accompanied by information about purchasing a more extensive license to the software module A. For example, payment information, details about the more extensive license, or other information may be provided. After the alert is provided at 1024, the method 900 may continue to 1026.

At 1026, the processor 118 communicate with the universally coordinated clock 128 to determine the current time. Next, at 1028, the processor 118 may compare the current time detected at 1026 with the extended time limit of 1018. If the extended time limit of 1018 is greater than the current time, it means that the license 232 is still active under the extended time period of 1018. Thus, the method 900 may loop back to 1020 and continue to allow access. The method 900 may loop between 1020, 1022, 1024, 1026, and 1028 until the license 232 expires under the extended time limit of 1018.

Once the license 232 expires under the extended time limit of 1018, the method 900 may loop back to 1014. Thus, the operating state of the aircraft may be checked (e.g., to determine whether the aircraft 102 is airborne or on-ground. At 1016, the system 100 may determine whether it is OK to being denying access to the software module A.

For example, if the aircraft 102 is now on-ground (and in some cases, in a power down mode), 1016 may be answered affirmatively. The method 900 may continue to 1030. At 1030, the system 100 may begin to deny access to the software module A. Subsequently, at 1032, an alert or other notification regarding the expiration of the trial license 232 may be provided. In some embodiments, for example, the alert may be provided by the display 220 and/or the speaker 222. In some embodiments, the system 100 may continuously and/or repeatedly provide the alert at predetermined time intervals (e.g., every five hours). Also, a predetermined number of alerts may be provided before the system 100 stops providing alerts. Furthermore, the alert may be accompanied by information about purchasing a more extensive license to the software module A. For example, payment information, details about the more extensive license, or other information may be provided. Additionally, credits may be extended to the user based on any past purchasing history that is stored within the user info module 124 of the CMC 120. The method 900 may terminate at 1033.

It will be appreciated that the method 900 may be modified in various ways without departing from the scope of the present disclosure. For example, the method 900 may begin at 1002, for example, for trial licenses 233 that are already active. For example, in the embodiment of FIG. 2A, the license 233 for software module B is already active. Thus, the method 900 may begin at 1002 for that software module. The subsequent features of the method 900 may progress as explained above.

Also, in some embodiments, the method 500 and/or the method 900 may be modified for managing the start (i.e., the commencement) of the software license. For example, in some embodiments, there may be software modules that have a predetermined future release date. In some embodiments, the CMC 120 may communicate that future release date to the system 108 of the aircraft 102. At some point, the system 108 may provide an alert or other notification that the software will become available for licensed use at that future release date. Once the software module is released, the system 100 may manage the start date of the license based on the current operating state of the aircraft 102. For example, as discussed above, it may be necessary for the aircraft 102 to be on ground before the user is able to enter into the license.

Accordingly, the system 100 and methods 500, 900 of the present disclosure manage software licenses (e.g., trial software licenses) in a useful manner In the above examples, expiration of the licenses is delayed until after the aircraft 102 lands. As such, the software can be used without interruption during the landing even if the license was set to expire under the original license terms. Also, the system 100 and methods 500, 900 may provide added security in the management of the software licenses.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A method of managing a license for a software module of a vehicle having a plurality of operating states, the method comprising:
receiving, by a processor, license term data of the license, the license term data including an expiration time limit of the license;
observing, by a sensor, a condition of the vehicle;
determining, by the processor, an operating state of the vehicle based on the condition observed by the sensor; and
determining, by the processor, whether to deny access to the software module according to the expiration time limit based on the determined operating state.

2. The method of claim 1, wherein receiving the license term data includes receiving a first expiration time limit of the license;
wherein determining the operating state includes determining, by the processor, that the vehicle is in one of a first operating state and a second operating state based on the condition observed by the sensor;
further comprising denying user access to the software module according to the first expiration time limit based on the determination that the vehicle is in the first operating state; and
further comprising denying user access to the software module according to an extended expiration time limit based on the determination that the vehicle is in the second operating state.

3. The method of claim 2, further comprising determining, by the processor, the extended expiration time limit by increasing the first expiration time limit by a predetermined time interval.

4. The method of claim 2, wherein the vehicle is an aircraft;
wherein observing the condition includes observing a current airspeed of the aircraft;
further comprising comparing, by the processor, the observed current airspeed to a predetermined threshold;

further comprising determining, by the processor, whether the aircraft is airborne or on ground based on the comparison of the current airspeed and the predetermined threshold;
further comprising denying user access to the software module according to the first expiration time limit based on the determination that the vehicle is on ground; and
further comprising denying user access to the software module according to the extended expiration time limit based on the determination that the vehicle is airborne.

5. The method of claim 2, wherein the vehicle is an aircraft;
wherein observing the condition includes observing a current altitude of the aircraft;
further comprising comparing, by the processor, the observed current altitude to a predetermined threshold;
further comprising determining, by the processor, whether the aircraft is airborne or on ground based on the comparison of the current altitude and the predetermined threshold;
further comprising denying user access to the software module according to the first expiration time limit based on the determination that the vehicle is on ground; and
further comprising denying user access to the software module according to the extended expiration time limit based on the determination that the vehicle is airborne.

6. The method of claim 2, wherein the vehicle is an aircraft with a landing gear, the landing gear being variable between a first condition and a second condition;
wherein observing the condition includes observing, by the sensor, whether the landing gear is in the first condition or the second condition;
further comprising determining, by the processor, that the aircraft is airborne based on the sensor observing the first condition of the landing gear;
further comprising determining, by the processor, that the aircraft is on ground based on the sensor observing the second condition of the landing gear;
further comprising denying user access to the software module according to the first expiration time limit based on the determination that the vehicle is on ground; and
further comprising denying user access to the software module according to the extended expiration time limit based on the determination that the vehicle is airborne.

7. The method of claim 2, wherein the vehicle is an aircraft with a parking brake, the parking brake being moveable between an engaged position and a disengaged position;
wherein observing the condition includes observing, by the sensor, whether the parking brake is in the engaged position or the disengaged position;
further comprising determining, by the processor, that the aircraft is airborne based on the sensor observing the parking brake in the disengaged position;
further comprising determining, by the processor, that the aircraft is on ground based on the sensor observing the parking brake in the engaged position;
further comprising denying user access to the software module according to the first expiration time limit based on the determination that the vehicle is on ground; and
further comprising denying user access to the software module according to the extended expiration time limit based on the determination that the vehicle is airborne.

8. The method of claim 2, further comprising receiving, by the processor, clock data from a universally coordinated clock, the clock data corresponding to a current time; and
further comprising comparing the current time to the first expiration time limit to determine an expiration status of the license.

9. The method of claim 1, wherein the software module is one of a plurality of software modules, and further comprising:
determining, by the processor, whether the plurality of software modules are licensable; and
determining, by the processor, whether a trial license is available for the licenseable ones of the software modules.

10. A system for managing a license for a software module of a vehicle, the system comprising:
a processor configured to receive license term data of the license, the license term data including an expiration time limit of the license; and
a sensor configured to observe a condition of the vehicle;
the processor configured to determine an operating state of the vehicle based on the observation by the sensor;
the processor configured to determine whether to deny access to the software module according to the expiration time limit based on the determined operating state of the vehicle.

11. The system of claim 10,
wherein the processor is configured to receive a first expiration time limit of the license;
wherein the processor is configured to determine that the vehicle is in one of a first operating state and a second operating state based on the observation by the sensor;
wherein the processor is configured to deny user access to the software module according to the first expiration time limit based on the determination that the vehicle is in the first operating state; and
wherein the processor is configured to deny user access to the software module according to an extended expiration time limit based on the determination that the vehicle is in the second operating state.

12. The system of claim 11, wherein the processor is configured to determine the extended expiration time limit by increasing the first expiration time limit by a predetermined time interval.

13. The system of claim 11, wherein the vehicle is an aircraft;
wherein the sensor is an airspeed sensor configured to observe a current airspeed of the aircraft;
wherein the processor is configured to compare the observed current airspeed to a predetermined threshold;
wherein the processor is configured to determine whether the aircraft is airborne or on ground based on the comparison of the current airspeed and the predetermined threshold;
wherein the processor is configured to deny user access to the software module according to the first expiration time limit based on the determination that the vehicle is on ground; and
wherein the processor is configured to deny user access to the software module according to the extended expiration time limit based on the determination that the vehicle is airborne.

14. The system of claim 11, wherein the vehicle is an aircraft;
wherein the sensor is an altitude sensor configured to observe a current altitude of the aircraft;

wherein the processor is configured to compare the observed current altitude to a predetermined threshold;

wherein the processor is configured to determine whether the aircraft is airborne or on ground based on the comparison of the current altitude and the predetermined threshold;

wherein the processor is configured to deny user access to the software module according to the first expiration time limit based on the determination that the vehicle is on ground; and wherein the processor is configured to deny user access to the software module according to the extended expiration time limit based on the determination that the vehicle is airborne.

15. The system of claim 11, wherein the vehicle is an aircraft with a landing gear, the landing gear having a first condition and a second condition;

wherein the sensor is a landing gear sensor configured to observe whether the landing gear is in the first condition or the second condition;

wherein the processor is configured to determine that the aircraft is airborne based on the sensor observing the first condition of the landing gear;

wherein the processor is configured to determine that the aircraft is on ground based on the sensor observing the second condition of the landing gear;

wherein the processor is configured to deny user access to the software module according to the first expiration time limit based on the determination that the vehicle is on ground; and wherein the processor is configured to deny user access to the software module according to the extended expiration time limit based on the determination that the vehicle is airborne.

16. The system of claim 11, wherein the vehicle is an aircraft with a parking brake, the parking brake being moveable between an engaged position and a disengaged position;

wherein the sensor is a parking brake sensor configured to observe whether the parking brake is in the engaged position or the disengaged position;

wherein the processor is configured to determine that the aircraft is airborne based on the sensor observing the parking brake in the disengaged position;

wherein the processor is configured to determine that the aircraft is on ground based on the sensor observing the parking brake in the engaged position;

wherein the processor is configured to deny user access to the software module according to the first expiration time limit based on the determination that the vehicle is on ground; and wherein the processor is configured to deny user access to the software module according to the extended expiration time limit based on the determination that the vehicle is airborne.

17. The system of claim 11, wherein the processor is configured to receive clock data corresponding to a current time from a universally coordinated clock; and wherein the processor is configured to compare the current time to the expiration time limit to determine an expiration status of the license.

18. A method of managing a license to an avionics software module for an aircraft comprising:

receiving, by a processor, license term data of the license, the license term data including a first expiration time limit of the license;

receiving, by the processor, clock data from a universally coordinated clock, the clock data corresponding to a current time;

comparing the current time to the first expiration time limit to determine an expiration status of the license;

observing, by a sensor, a condition of the vehicle;

determining, by the processor, that the aircraft is in one of a first operating state and a second operating state based on the condition observed by the sensor;

denying access to the software module according to the first expiration time limit based on the determination that the vehicle is in the first operating state; and denying access to the software module according to an extended expiration time limit based on the determination that the vehicle is in the second operating state, wherein the extended expiration time limit is equal to the first expiration time limit increased by a predetermined time interval.

19. The method of claim 18, wherein determining that the aircraft is in one of the first operating state and the second operating state includes determining that the aircraft is in one of an airborne operating state and an on ground operating state.

20. The method of claim 18, wherein the avionics software module is one of a plurality of avionics software modules, and further comprising:

determining, by the processor, whether the plurality of avionics software modules are licensable; and determining, by the processor, whether a trial license is available for the licensable ones of the avionics software modules.

* * * * *